May 28, 1968 L. B. ROOF 3,385,101
CHROMATOGRAPHIC ANALYZER
Filed Nov. 16, 1964
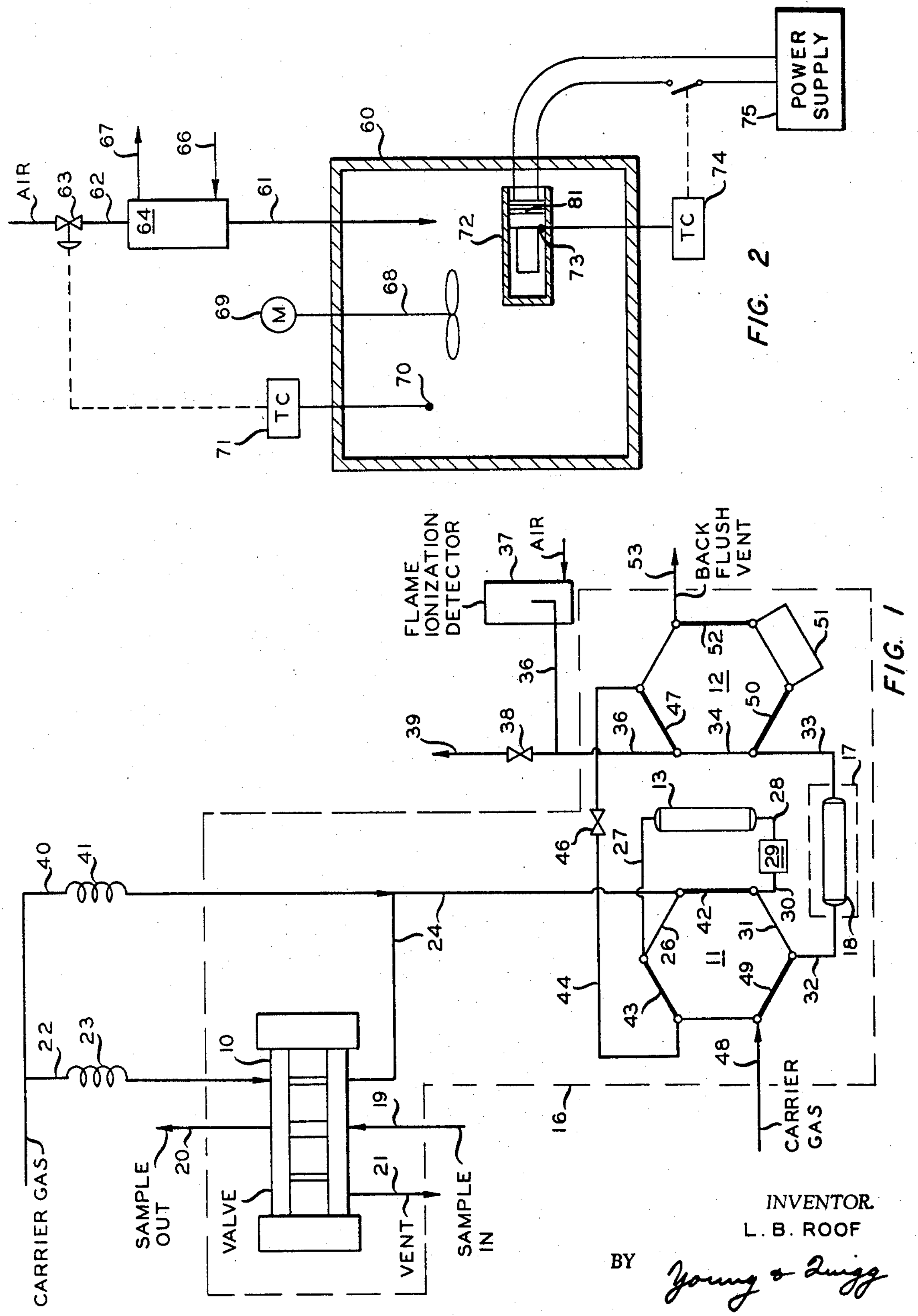
INVENTOR.
L. B. ROOF
BY Young & Quigg
ATTORNEYS

United States Patent Office 3,385,101 Patented May 28, 1968

3,385,101

CHROMATOGRAPHIC ANALYZER

Lewis B. Roof, Bartlesville, Okla., assignor to Phillips Petroleum Company, a corporation of Delaware Filed Nov. 16, 1964, Ser. No. 411,238
5 Claims. (Cl. 73—23.1)

ABSTRACT OF THE DISCLOSURE

A multicomponent sample is introduced into a first chromatographic column maintained at an elevated temperature. After at least two of the components of the sample are eluted from the first chromatographic column and are passed into a second chromatographic column maintained at a lower temperature than the first chromatographic column, the first column is backflushed. The backflushed effluent from the first column and the effluent from the second column are sequentially passed to an ionization detector. The second column can be inside a cooled chamber which is positioned, along with the first column and associated valves, in a heated chamber.

This invention relates to a method and apparatus for the analysis of fluids. In another aspect, this invention relates to a method and apparatus for the chromatographic analysis of fluids employing multiple chromatographic zones. In yet another aspect, this invention relates to a method and apparatus for the chromatographic analysis of fluids employing a first chromatographic zone which is heated and a second chromatographic zone maintained at a subambient temperature.

In various industrial operations, there is a need for analytical procedures capable of continuously measuring the concentration of constituents of process streams. One analytical procedure which has become quite valuable for making such analysis involves chromatography. In elution chromatography, a sample of material to be analyzed is introduced into a column which contains a selective sorbent. A carrier gas is directed into the column so as to force the sample material therethrough. The sorbent attempts to hold the constituents of the mixture, whereas the carrier gas tends to force the constituents through the column. This results in the several constituents of the fluid mixture traveling through the column at different rates of speed, depending upon their affinity for the packing material. The column effluent thus consists initially of the carrier gas alone, the individual constituents of the fluid mixture appearing later at spaced time intervals. Conventionally, the concentration of these constituents is determined by means of a thermal conductivity analyzer which compares the thermal conductivity of the effluent gas with the thermal conductivity of the carrier gas directed to the column.

Analyzers of this general type have proved to be quite useful in the analysis of process fluid mixtures. The process stream analyzer containing a chromatographic column or columns and the sample is maintained at a constant temperature, normally at an elevated temperature, while the sample is being passed through the column or columns. To insure maintenance of the constant temperature during the analysis, the process stream analyzer is enclosed within a housing and the enclosed area and the equipment therein maintained at a constant temperature.

It is often desirable to analyze process streams containing, for example, constituents of trace concentration and constituents having widely different volatilities. Under such conditions, it is not feasible to employ a chromatographic column, or columns, maintained at a constant temperature to make a complete analysis of the process stream in the alloted time for analysis. The alloted time for analysis is normally restricted to permit the effective use of the results of the analysis to control the process.

According, an object of my invention is to provide an improved chromatographic method of analysis and apparatus therefor.

Another object of my invention is to provide an improved process stream chromatographic analyzer.

Another object of my invention is to provide a chromatographic analyzer having hot and cold chromatographic zones.

Other objects, advantages and features of my invention will be readily apparent to those skilled in the art from the following description, the drawing and appended claims.

By my invention, I have provided a chromatographic analyzer containing both hot and cold chromatographic analysis zones particularly suitable for the analysis of process streams in the direct control of processes.

FIGURE 1 is a schematic representation of one embodiment of the invention.

FIGURE 2 illustrates the method of heating and cooling the first and second chromatographic zones, respectively.

Referring to the drawing and more particularly to FIGURE 1, therein is illustrated a sample valve 10, multi-port, multi-channel valve means 11 and 12, chromatographic column 13 and detector 29 positioned within zone 16, hereinafter referred to as the hot zone. Positioned within hot zone 16, but insulated therefrom, is a cold zone 17 containing a chromatographic column 18. The term "hot zone" as herein employed refers to a zone maintained at a temperature above the ambient temperature. The term "cold zone" as herein employed refers to a zone maintained at a temperature below the temperature of said hot zone and to include sub-ambient temperatures.

A fluid sample mixture is introduced via conduit means 19 to valve 10 and withdrawn from valve means 10 via conduit means 20. Valve 10 can be a conventional chromatographic sampling valve means for introducing a fluid sample into a carrier gas stream. A suitable sample slide valve is described in U.S. Patent 2,846,121. Valve means 10 is provided with a vent means 21. A carrier gas such as helium is introduced via conduit means 22 to valve 10. The carrier gas is preheated by a conventional heat exchange means 23. The carrier gas containing the sample fluid mixture is passed from valve 10 via conduit means 24 to valve means 11. As previously described, valve means 11 is a multi-port, multi-conduit valve means. A suitable multi-port valve means is described in U.S. Patent 3,111,849. It is understood by those skilled in the art that the positioning of valves 10, 11 and 12 can be controlled by conventional timing mechanisms known and generally used in the art of chromatographic analysis.

Carrier gas containing the sample fluid mixture is passed through valve means 11 via conduit means 26 and from valve means 11 via conduit means 27 to chromatographic column 13 containing a suitable packing material capable of selectively retarding the flow of the constituents of the sample fluid mixture directed thereto.

As illustrated, column 13 is maintained at an elevated temperature (above ambient). The effluent from chromatographic column 13 is passed via conduit means 28 to a conventional detector 29 adapted to measure a property of the fluid mixture directed thereto, which property is representative of the composition of the fluid mixture. Detector 29 can advantageously comprise a temperature sensitive resistance element disclosed in the path of fluid flow. A reference element, not shown, can be disposed in the carrier gas flow. Such a detector provides signals representative of the difference in thermal conductivity between the column effluent and the carrier gas. The temperature difference between the resistance elements can be measured by an electrical bridge circuit, such as a Wheatstone bridge, for example. However, detector 29 can also be any other type of apparatus known in the art of measuring a property of a gaseous stream representative of the composition thereof.

Responsive to detector 29, a portion of the sample fluid mixture directed to column 13 is passed via conduit means 30 to valve means 11, through valve means 11 via conduit means 31, and from valve means 11 to a chromatographic column 18 via conduit means 32. Chromatographic column 18 contains a suitable packing material capable of selectively retarding the flow of the constituents of the sample fluid mixture directed thereto. As illustrated, chromatographic column 18 is maintained within cold zone 17, said cold zone 17 positioned within hot zone 16 and insulated therefrom. A means of heating zone 16 and cooling cold zone 17 is illustrated in FIGURE 2 and will hereinafter be described.

As illustrated in FIGURE 1, the invention provides, for example, for the passage of a sample fluid mixture containing a light fraction and a heavy fraction to chromatographic column 13. The heavy fraction is retained in column 13 and the light fraction is passed to chromatographic column 18. By operating column 13 at an elevated temperature, separation of the light and heavy fractions can be readily attained in a minimum period of time. By operating chromatographic column 18 at a relatively low temperature, preferably subambient, improved resolution of the constituents of the light fraction directed to chromatgraphic column 18 is effected. Due to the lower temperature, the time of retention within chromatographic column 18 is increased. By removing the heavy fraction prior to passage of the light fraction to chromatographic column 18, the over-all analysis period is held to a minimum. Thus, control of a process can be based upon the chromatographic analysis of a fluid sample which provides a result in the shortest period of time, enabling continuous effective control of the process.

The effluent from chromatographic column 18 is passed via conduit means 33 to valve means 12. Valve means 12 is a multi-port, multi-conduit valve means such as valve means 11. The effluent is passed through valve means 12 via conduit means 34 and from valve means 12 via conduit means 36 to a detector 37. Detector 37 can be a conventional detector such as described with respect to detector 29. Preferably, however, detector 37 is a flame ionization detector which has the advantage of high sensitivity and high speed response. These particular advantages are particularly important when the chromatographic analyzer of this invention is employed as an onstream analyzer in the control of a process. When employing the inventive analyzer in a control system, the flame ionization detector is preferably an explosion-proof detector assembly.

That portion of the sample fluid mixture retained within column 13 is removed from column 13 by passing the carrier gas in a flushing operation via conduit means 22, conduit means 40, preheater 41, and conduit means 24 to valve means 11. The carrier gas is passed through valve means 11 via conduit means 42 and from valve means 11 via conduit means 30 to detector 29. Carrier gas is passed from detector 29 via conduit means 28 to chromatographic column 13 and from chromatographic column 13 via conduit means 27 to valve means 11. Carrier gas passing through conduit means 27 to valve means 11 contains that portion of the sample fluid retained within column 13. The carrier gas containing sample fluid is passed through valve means 11 via conduit means 43 and from valve means 11 via conduit means 44 and back flush restriction means 46 to valve means 12. The back flushing carrier gas is passed through valve means 12 via conduit means 47 and vented from valve means 12 via conduit means 39 and restriction means 38.

Chromatographic column 18 is flushed by passing a carrier gas via conduit means 48 to valve means 11, through valve means 11 via conduit means 49 and from valve means 11 to chromatographic column 18 via conduit means 32. The flushing carrier gas is passed from chromatographic column 18 via conduit means 33 to valve means 12, through valve means 12 via conduit means 50, conduit means 51 and conduit means 52 to a vent conduit means 53.

Referring to FIGURE 2, oven 60 is heated by air introduced into ovn 60 via conduit means 61. The air is passed via conduit means 62 and valve means 63 to a heat exchange means 64 such as a furnace. The resultant heated air is passed via conduit means 61 to oven 60 in the previously described manner. A heat exchange medium is passed to heat exchange means 64 via conduit means 66 and withdrawn from heat exchange means 64 via conduit means 67. The heated air is circulated within oven 60 by a fan means 68 driven by motor means 69. The temperature within oven 60 is sensed by a conventional temperature sensing means 70. Responsive to the temperature within oven 60, a conventional temperature controller 71 opens and closes valve 63 in conduit 62 so as to maintain the temperature within oven 60 constant.

Valves 10, 11 and 12, and column 13 are positioned within oven 60. Also positioned within oven 60, but insulated therefrom, is a cold chamber 72. Cold chamber 72 contains chromatographic column 18. A constant temperature can be maintained within cold chamber 72 by conventional means such as provided by a thermoelectric cooling system 81. As illustrated in FIGURE 2, the temperature within cold chamber 72 is determined by a conventional temperature sensing means 73 and responsive to said temperature sensing means 73 a conventional temperature controller 74 manipulates the flow of electrical energy from power supply 75 to the thermoelectric cooling means 81 within cold chamber 72 so as to maintain a constant temperature within cold chamber 72 and column 18.

In a specific embodiment of the invention, hydrogen is employed as a carrier gas and introduced via conduits 22 and 48 into hot zone 16 maintained at a temperature of 120° F. The hot zone temperature is maintained by heating air to a temperature of 250° F. in heater 64 and passing the heated air to hot zone 16 as previously described.

Column 13 is a ⅛" O.D. x .020-inch wall stainless steel tubing. Column 13 contains 6" of Carbowax 400 (a polyethylene glycol compound distributed by Union Carbide Chemicals Company and illustrated in the 1958 edition of the Physical Properties of Synthetic Organic Chemicals bulletin) as a packing material followed by 18" of a packing material consisting of 7 weight percent bis-2-ethoxyethyl adipate on $^{80}/_{100}$ mesh Chromosorb P (an inert packing material distributed by Johns-Manville). Column 18 is a ⅛" O.D. x .020-inch wall stainless steel tubing 20 feet in length and packed with 10 weight percent 8-chloroquinoline on $^{80}/_{100}$ mesh Chromosorb P.

Column 18 is positioned within cold zone 17. Cold zone 17 is maintained at a temperature of 45° F. by means of a thermoelectric heating unit. The "hot side" of the thermoelectric unit is water cooled.

Hydrogen as a carrier gas and containing .2 microliter of a fluid sample is pased at the rate of 70 cc. per minute to column 13. The fluid sample comprises methane, ethane, propane, isobutane, normal butane, isopentane, normal pentane, 2,2-dimethylbutane, 2,3-dimethylbutane, 2-methylpentane, 3-methylpentane, normal hexane, 2,2-dimethylpentane, 2,4-dimethylpentane, methylcyclopentane, cyclohexane, $C_7$ and heavier hydrocarbons.

That portion of the fluid sample comprising $C_7$ and heavier hydrocarbons is retained within column 13. After a period of 1.6 minutes, column 13 is backflushed with hydrogen. The remainder of the fluid sample passed to column 13 is passed to column 18. After a second period of 1.2 minutes, the backflushing carrier gas containing the $C_7$ and heavier hydrocarbons is passed via conduit means 36 from valve means 12 to flame ionization detector 37 wherein the concentration of $C_7$ and heavier hydrocarbons in the sample fluid directed to column 13 is determined.

After a period of 3.6 minutes has elapsed from the time that the sample fluid was first passed to column 13, the effluent from column 18 is passed to flame ionization detector 37 wherein the concentration of the remaining constituents of the sample fluid is determined.

The total time for making the above complete analysis of the sample fluid mixture is 30 minutes. Conventionally employing a chromatographic zone or zones maintained at a constant temperature of 45° F. would have resulted in a total analysis time of about 60 minutes to obtain a satisfactory separation and analysis. Therefore, it is evident that the invention of employing both hot and cold chromatographic zones has provided a substantially improved method for analyzing fluid mixtures containing relatively volatile and relatively non-volatile fractions in that the analysis time has been substantially reduced. Analysis of the fluid mixture at an elevated temperature could not be conducted satisfactorily.

As will be evident to those skilled in the art, various modifications of this invention can be made, or followed, in the light of the foregoing disclosure, without departing from the spirit or scope thereof.

I claim:

1. A method of analyzing fluid mixtures which comprises introducing a fluid mixture into a first zone containing a partitioning material that selectively retards passage therethrough of the constituents of said mixture, maintaining said first zone at an elevated temperature, eluting at least two components of said fluid mixture from said first zone, passing the thus eluted components from said first zone to a second zone positioned within said first zone and containing a partitioning material that selectively retards passage therethrough of the constituents of said eluted components, maintaining said second zone at a lower temperature than the temperature of said first zone, said lower temperature being below ambient temperature, backflushing said first zone to elute the remaining components of said fluid mixture, and sequentially passing the effluent from said second zone and the backflushed effluent from said first zone to an ionization detector to measure a property of said second zone effluent which is representative of the composition thereof and to measure a property of said backflushed effluent from said first zone which is representative of the composition thereof.

2. The method of analysis of claim 1 wherein said fluid mixture comprises a $C_6$ hydrocarbon stream containing $C_7$ and heavier hydrocarbons, said first zone is maintained at a temperature of 120° F., and said second zone is maintained at a temperature of 45° F.

3. Apparatus comprising a first chamber, a first column positioned within said first chamber and containing a packing material that selectively retards the passage therethrough of the constituents of a fluid mixture directed thereto, a first valve means positioned within said first chamber, a first conduit means in communication with said first valve means, a second valve means positioned within said first chamber, a second conduit means communicating between said first valve means and said second valve means, third conduit means communicating between said second valve means and said first column, fourth conduit means communicating between said first column and said second valve means, a second chamber positioned within said first chamber, a second column positioned within said second chamber and containing a packing material that selectively retards the passage therethrough of the constituents of a fluid mixture directed thereto, fifth conduit means communicating between said second valve means and said second column, a third valve means positioned within said first chamber, sixth conduit means communicating between said second column and said third valve means, means for measuring a property of a fluid mixture directed thereto representative of the composition thereof, seventh conduit means communicating between said third valve means and said means for measuring, means for maintaining an elevated temperature within said first chamber, and means for maintaining a temperature within said second chamber below that of the temperature maintained within said first chamber.

4. The apparatus of claim 3 wherein said means for measuring comprises a flame ionization detector.

5. The apparatus of claim 3 to include eighth conduit means in communication with said second valve means, ninth conduit means in communication with said third valve means, tenth conduit means communicating between said second and third valve means, and means for measuring a property of a fluid flowing through said fourth conduit means representative of the composition thereof.

References Cited

UNITED STATES PATENTS

| | | | |
|---|---|---|---|
| 1,967,185 | 7/1934 | Clapp | 73—23.1 |
| 3,120,749 | 2/1964 | Paglis et al. | 73—23.1 |
| 3,148,532 | 9/1964 | Broerman | 73—23.1 |
| 3,156,548 | 11/1964 | Perry | 73—23.1 XR |
| 3,224,499 | 12/1965 | Reinecke | 73—23.1 XR |
| 3,234,779 | 2/1966 | Dawson | 73—23.1 |

RICHARD C. QUEISSER, *Primary Examiner.*

JAMES J. GILL, *Examiner.*

C. A. RUEHL, *Assistant Examiner.*